No. 818,057. PATENTED APR. 17, 1906.
R K SWIFT.
HAY LOADER.
APPLICATION FILED JUNE 2, 1905.
3 SHEETS—SHEET 3.
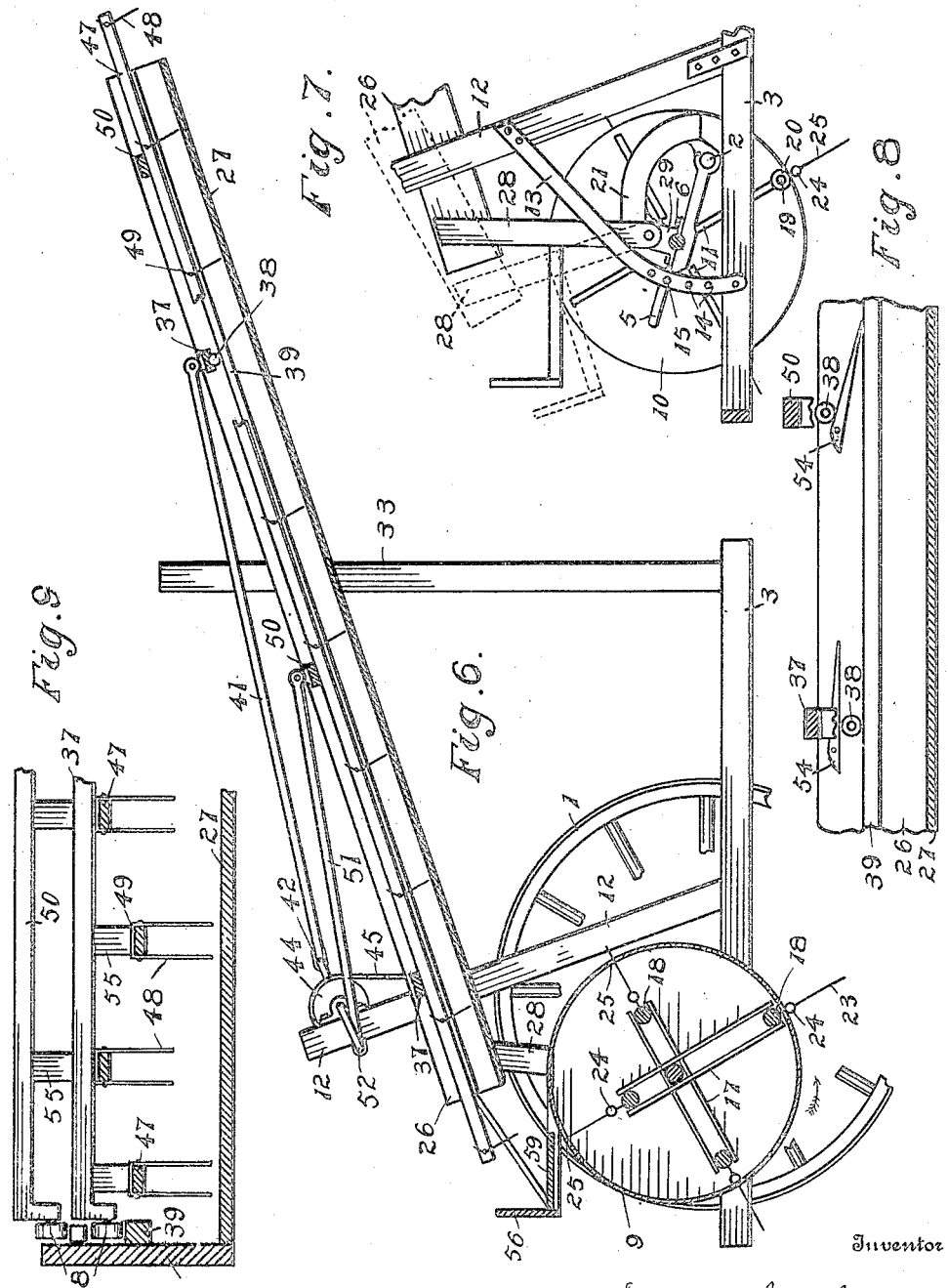
Witnesses
H. H. Hunt.
R. W. C. Mitchell
Inventor
R. K. Swift.
By Walter N. Haskell.
Attorney

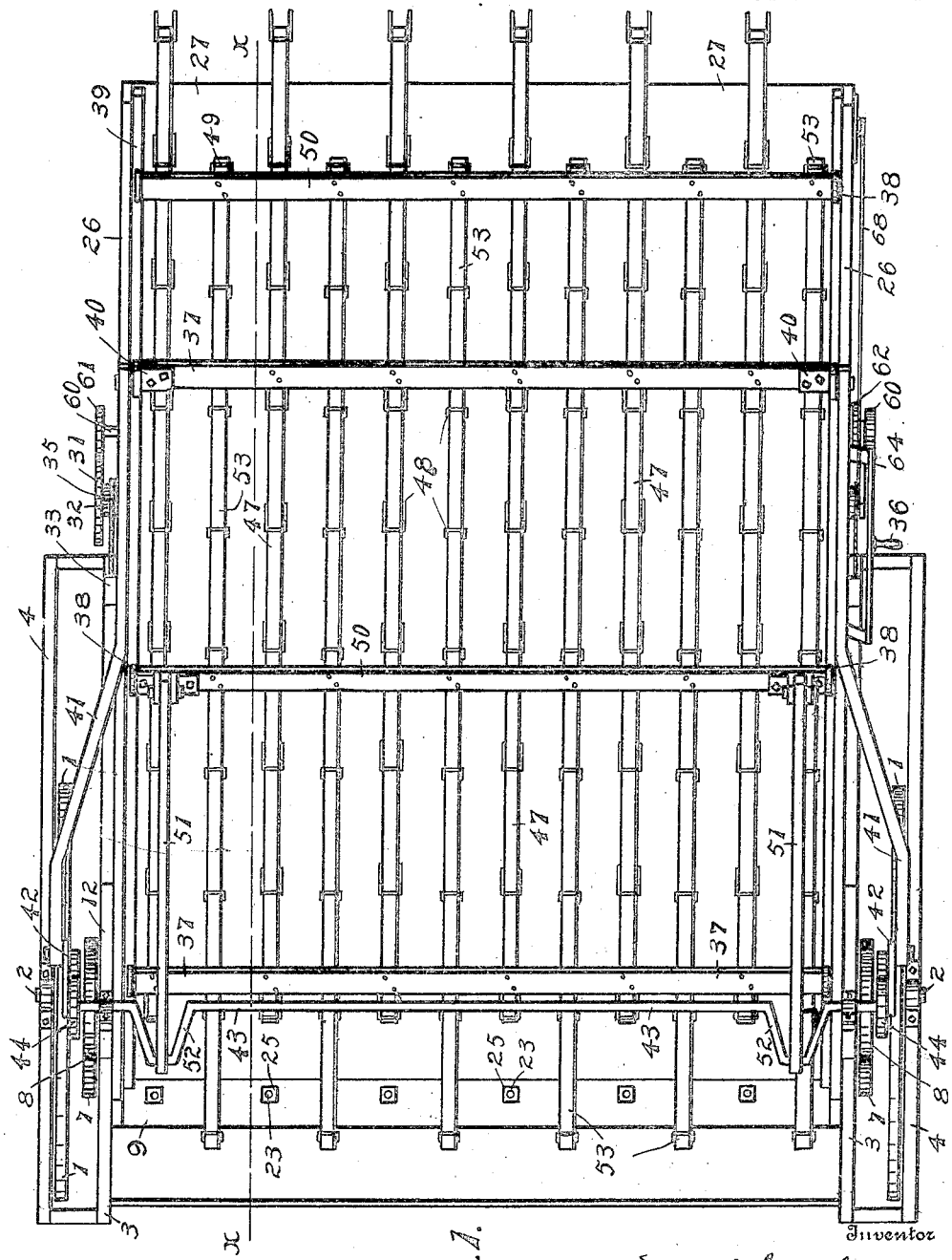

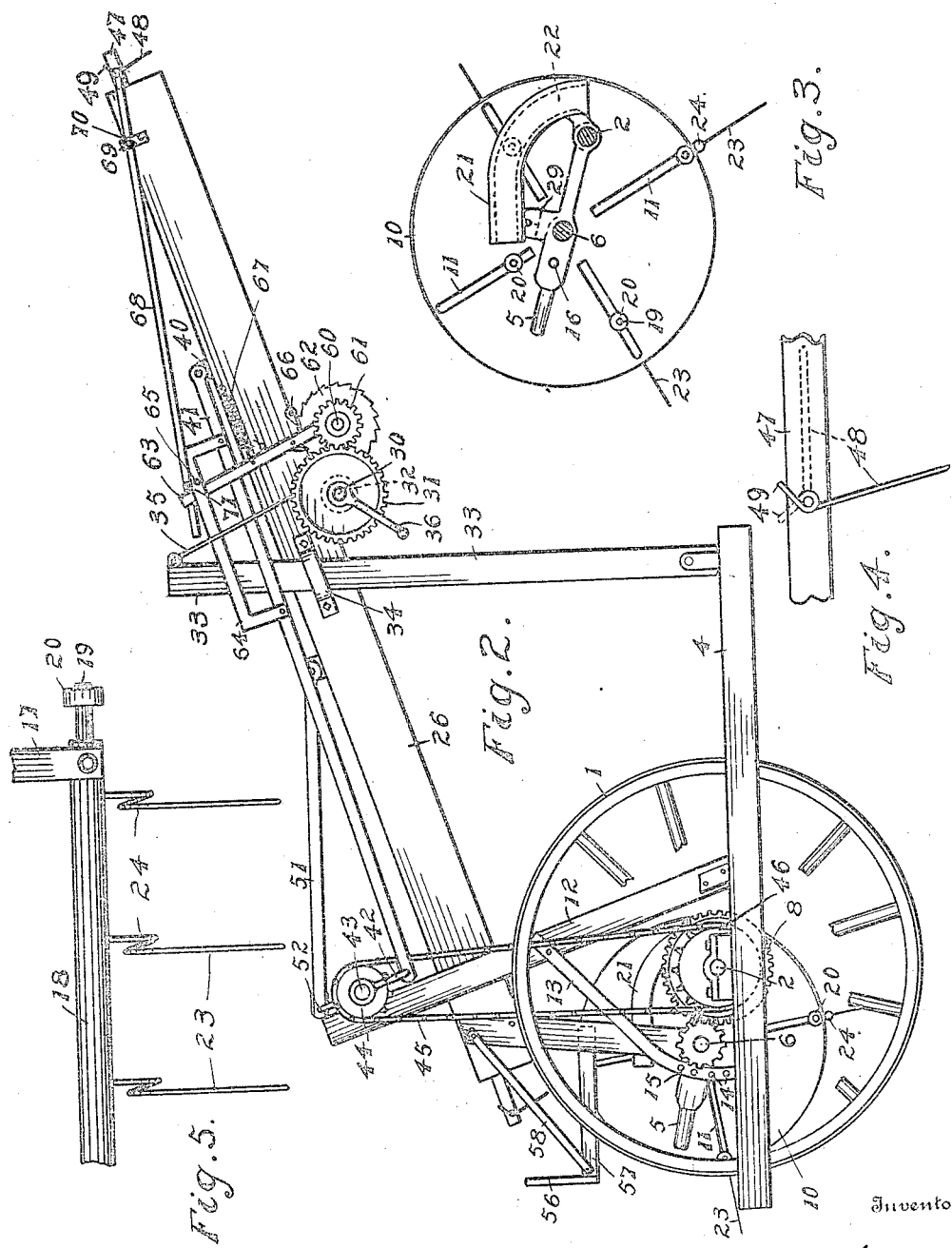

UNITED STATES PATENT OFFICE.

R K SWIFT, OF STERLING, ILLINOIS.

HAY-LOADER.

No. 818,057.

Specification of Letters Patent.

Patented April 17, 1906.

Application filed June 3, 1905. Serial No. 263,411.

*To all whom it may concern:*

Be it known that I, R K SWIFT, a citizen of the United States, residing at Sterling, in the county of Whiteside and State of Illinois, have invented certain new and useful Improvements in Hay-Loaders; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention has reference to hay-loaders, and comprises certain novel devices for removing the hay from the ground and other novel mechanism for conveying or elevating the hay from said first-named devices to the wagon to be loaded thereon. I also provide a novel means for gradually raising the upper end of the elevator mechanism as the loading operation progresses. These and other advantages of my invention will more fully appear from the following specification, reference being had to the drawings accompanying the same, in which—

Figure 1 is a plan view of my device. Fig. 2 is a side elevation thereof. Fig. 3 is a detail showing one end of the cylinder 9 and cam 21 adjacent thereto. Fig. 4 is a detail showing one of the teeth 48. Fig. 5 is a detail showing a portion of one of the rake-bars 18. Fig. 6 is a vertical longitudinal section in the line $x$ $x$ of Fig. 1. Fig. 7 is an end elevation of the rake-cylinder 9 and supporting mechanism therefor. Fig. 8 is a detail showing a section of the inner face of one of the sides 26 and method of vibrating the lower ends of the elevator-bars. Fig. 9 is a detail showing part of the elevator-bars in cross-section and manner of supporting same.

Similar numbers refer to similar parts throughout the several figures.

1 1 are the carrying-wheels on short shafts 2, supported at their inner ends on the frame 3 and at their outer ends on supports 4, fixed to the frame 3. In 2, 3, and 7 is shown a hand-lever 5, fulcrumed at its forward end on the shaft 2 and supporting one end of a rotary shaft 6, on the ends of which are fixed gear-pinions 7, actuated by gear-wheels 8 on the shaft 2. Fixed on the shaft 6 is a rake-cylinder 9, provided at each end with a head 10, each of such heads having a plurality of equidistant radial slots 11, preferably four in number.

Fixed on the frame 3 at each end of the cylinder 9 is a support 12, to which is fastened the upper end of a brace 13, the lower end of such brace being curved rearwardly and fixed to the frame 3. In the curved portion of the brace is a series of holes 14, a bolt 15 passing through one of said holes and through a perforation 16 in the lever 5. This furnishes a support for the rear end of such lever.

At each end of the cylinder 9, on the inner side thereof, are two racks 17, the bars of which loosely embrace the shaft 6. Extending longitudinally of the cylinder are four tooth-bars 18, the ends of which are secured in the ends of the racks 17. In the ends of the bars 18 are fixed small stud-shafts 19, which severally project through the slots 11 and have rollers 20 on their outer ends. Supported on the lever 5 is a cam 21, having on its inner face a track 22, (shown in dotted lines,) which engages each of the rollers 20 in succession during a portion of the rotation of the cylinder 9. Each end of the cylinder is provided with one of the cams 21, (only one being shown,) which cams act coincidently upon the rollers 20 on the ends of each tooth-bar 18.

Each of the bars 18 is provided with a plurality of teeth 23, each of such teeth being rendered flexible near its point of attachment to the bar by means of a coil 24 in such tooth. The teeth are adapted to be projected outwardly from the cylinder through a series of openings 25, provided in such cylinder in line with each row of the teeth.

The movement of the machine causes the cylinder 9 to rotate in a direction contrary to that of the wheels 1, and when not otherwise controlled the tendency of the tooth-bars 18, by reason of the weight thereof, is to maintain a position at the lower side of the cylinder with the teeth 23 protruding therefrom. As the cylinder continues to rotate, the rollers 20, on the ends of one of the bars 18, are engaged by the cams 21, the form of such cams being such that said bar is gradually drawn toward the center of the cylinder, the teeth on such bar being gradually withdrawn within the cylinder until when they arrive at the upper side thereof they have entirely disappeared. The bars 18 being fastened together in pairs, as the teeth recede on one side of the cylinder they are gradually projected on the opposite side, so that they are in position to engage the hay on the ground beneath the cylinder and draw it upwardly therefrom. It will be seen that the two series of teeth 23 are thus controlled and actuated by one operation of the cams 21, and upon the rollers of the other tooth-bar of the pair coming into engagement with such cams the operation of said bars and the teeth thereon is reversed. The action of the teeth just above described is such that the hay is carried upwardly upon the cylinder 9 until it reaches the upper side thereof, at which point the teeth cease their engagement therewith and the hay is in position to be acted upon by other mechanism, as hereinafter shown. If the teeth 23 come in contact with any inequality of the ground or any slight obstruction thereon while protruding from the cylinder, their flexible connection with the bar permits them to independently bend and pass over the same.

26 26 represent the side pieces of the elevator, and 27 the floor thereof. Referring to one side of the machine, as shown in Fig. 2, the side 26 is supported at its rear end by a standard 28, pivoted at its lower end on a plate 29 integral with the lever 5. On the lower side of the elevator is journaled a shaft 30, on which is fixed a gear-wheel 31, integral with which is a drum 32, dotted lines. Supported on the frame 3 so as to have rocking movement lengthwise thereof is a support 33, passing through a guide 34 on the side 26. Fixed to the upper end of the support 33 is a rope 35, the other end of such rope being attached to the drum 32. Upon the rotation of the drum in the proper direction the rope is wound thereon and the upper end of the elevator raised. Fixed to the shaft 30 is a crank 36, by means of which said drum may be rotated, and said drum is also adapted to be automatically operated in the manner hereinafter described. Both sides of the machine are similarly provided with the means for supporting the elevator hereinbefore described.

Transversely of the elevator is a pair of cross-pieces 37, provided at their ends with rollers 38, running on tracks 39 on the inner faces of the sides 26. The ends of the upper cross-piece 37 are provided with angle-plates 40, to which are pivotally secured the forward ends of a pair of pitmen 41, the rear ends thereof being connected with cranks 42 on the ends of a shaft 43, journaled near the upper ends of the supports 12. The shaft 43 is actuated by means of sprocket-wheels 44, fixed thereon, driven by chains 45 from sprocket-wheels 46 on the shafts 2.

Supported beneath the cross-pieces 37 is a plurality of elevator-bars 47, each having a plurality of teeth 48 arranged in equidistant pairs, each pair being united by a loop 49. At the point of junction of the teeth and loop the teeth are swingingly attached to the sides of the bars 47, the loop 49 being normally in contact with the upper face of the bar and at such an angle to the teeth as to limit their rearward movement to practically a right angle to the bar extending downwardly therefrom. They are, however, permitted to swing forwardly and upwardly into line with the bar, as shown in Fig. 4.

Parallel with the cross-pieces 37 and alternating therewith is a similar pair of cross-pieces 50, also provided at their ends with rollers 38, running on the tracks 39. Pitmen 51 are pivotally attached at their forward ends to the rear bar 50 and at their rear ends to cranks 52 in the shaft 43, the cranks 52 being disposed upon the shaft 43 diametrically opposite to the cranks 42. Supported from the cross-bars 50 is a series of elevator-bars 53, alternating with the bars 47 and similarly provided with a plurality of swinging teeth 48. By the rotation of the shaft 43 during the operation of the machine the bars 47 and 53 are given an alternating reciprocating movement longitudinally of the machine, causing the teeth 48 to engage the hay at the lower end of the elevator and by successive stages convey it to the upper end thereof. In the upward movement of the elevator-bars the teeth are embedded deeply in the hay, but in the rearward movement the teeth swing upwardly and slide over the hay, again engaging the same at the lower end of the stroke. As one set of bars alternates with the other the movement of the hay is practically continuous. The swinging action of the teeth permits the movement of all of the elevator-bars in the same plane, but, if desired, a vertical movement may be given to the lower ends of such bars by the means shown in Fig. 8. Pivoted on the inner face of the side 26 is a pair of wedge-shaped cams 54, one of which is engaged by the roller 38 on the lower cross-piece 37 and the other by the roller 38 on the cross-piece 50. The free ends of the cams extend forwardly and normally rest upon the track 39. In the rearward movement of the cross-pieces the rollers pass along the upper edges of the cams, dropping therefrom to the track, and in the return movement pass under the cams, such cams being raised thereby and dropping again into contact with the track after the passage of the rollers. To prevent the interference of the cross-pieces of one set of bars with the bars of the other set in the operation just described, it is necessary to suspend the elevator-bars independently at a little distance below their respective cross-pieces, and this is accomplished by the use of blocks 55 or similar means. Cams 54 are provided for the rollers 38 at each end of the lower cross-pieces, only one pair thereof being shown in the drawings. By this construction the teeth 48 at the rear ends of the bars are not only permitted to swing upwardly and pass over the hay, but they are elevated slightly above the same, so as to facilitate the insertion of the teeth into the hay at a right angle to the line of movement thereof. The use of this mechanism is optional, however, and is not essential to the successful operation of the machine.

At the rear end of the elevator is a guard comprising a back piece 56, supported by braces 57 and 58, secured to the support 28 and side piece 26, respectively, and a bottom board 59 on a line with the upper face of the cylinder 9. By this means the hay is prevented from being carried over the top of the cylinder and to the rear thereof, but is held above the cylinder until it is engaged by the elevator-teeth 48. In their rearward movement the elevator-bars extend a sufficient distance beyond the lower end of the elevator-floor to enable the lower teeth thereon to seize the hay supported by the guard.

Journaled beneath the side piece 26 near the wheel 31 is a rotary shaft 60, on which is fixed a small gear-wheel 61, meshing with the wheel 31. There is also secured on the shaft 60 a ratchet-wheel 62, actuated by a ratchet-arm 63, pivoted on the shaft 60. Fixed on the side of the pitman 41 is a frame 64, provided with a pin 65, engaging the upper end of the ratchet-arm 63, so as to move such arm rearwardly at each rearward movement of the pitman, thus causing the rotation of the shaft 60 and imparting the movement thereof through the wheels 61 and 31 to the drum 32. The rope 35 is shortened by being wound upon the drum and the forward end of the elevator raised, as hereinbefore described. A dog 66 on the side 26 prevents the backward rotation of the ratchet-wheel 62, while a coiled spring 67, fixed at one end to the side 26 and at the other end to the arm 63, causes such arm to return to its former position upon the return stroke of the pitman 41. 68 is a rod adjustably held at its front end in a bracket 69 by means of a set-screw 70. At its rear end the rod 68 is provided with a pin 71, engaging the upper end of the ratchet-arm 63. By moving the rod 68 rearwardly the forward movement of the arm 63 is correspondingly limited and the movement of the ratchet-wheel 62 decreased. This also lessens the movement of the drum 32 and the front end of the elevator is raised more gradually.

If it is desired to lock the ratchet-arm 63 at the rearward end of its stroke, so that there will be no operation of the raising mechanism, this can be accomplished by securing the rod 68 in its extreme rearward position. When it is desired to operate the raising mechanism rapidly, the rod 68 is secured with the pin 71 just out of engagement with the arm 63 when in its forward position, whereby such arm moves freely without interference from the rod. The location of the rod 68 at the forward end of the elevator permits it to be easily adjusted by the operator on the wagon.

As the forward end of the elevator is raised the rear end thereof rocks rearwardly on the support 28, as shown in broken lines in Fig. 7. By reason of the fact that the support just referred to is pivoted just above the central point of the cylinder 9 in the movement of the elevator the lower end thereof, the guard in rear thereof, and the upper face of the elevator maintain practically the same relative positions and the passage-way for the hay between the cylinder and the lower end of the elevator-floor is not varied in width.

If desired to raise or lower the cylinder 9, so as to bring the teeth 23 farther away from or nearer to the ground, this can be done by adjustment of the levers 5 upon the braces 13. Such change in the position of the cylinder does not disturb the relative positions of the parts appurtenant thereto, all of such parts being either directly or indirectly supported on the levers 5.

What I claim as my invention, and desire to secure by Letters Patent of the United States, is—

1. In a hay-loader, the combination of mechanism for gathering the hay from the ground; mechanism for conveying the hay from the gathering mechanism to the wagon, to be loaded thereon; and means for automatically raising the forward end of the conveying mechanism, as the loading operation progresses, substantially as shown and described.

2. In a hay-loader, the combination, with the elevator floor and sides, suitably mounted in the machine, of two series of elevator-bars, suitably mounted above said floor, each of said bars being provided with a plurality of swinging teeth; means for imparting to said series of elevator-bars an alternating reciprocating movement; means for gathering the hay from the ground and delivering it to said elevator-bars; and means for automatically raising the forward end of the elevating devices, through the action of such elevator-bars while the operation of loading is in progress, substantially as shown and described.

3. In a hay-loader, the combination of a cylinder 9, and shaft 6 centrally thereof; a pair of tooth-bars 18, extending longitudinally of said cylinder; a pair of racks 17 loosely embracing said shaft, and rigidly connecting said tooth-bars; and means for imparting to said pair of tooth-bars a vibratory movement transversely of the cylinder at each half-rotation thereof, substantially as and for the purpose named.

4. In a device of the class named, the combination of the shaft 6, rotatably mounted in the machine; the cylinder 9, fixed on the shaft 6, and provided in its ends with radial slots 11; the tooth-bars 18 within the cylinder 9, and provided at their ends with rollers 20, outside the ends of the cylinder; the series of flexible teeth 23, fixed to said bars; the racks 17, rigidly connecting the bars in oppositely-disposed pairs; and the cams 21, suitably supported near the ends of the cylinder 9, and adapted to successively engage the rollers 20, during a partial rotation of the cylinder, substantially as shown.

In testimony whereof I affix my signature in presence of two witnesses.

R K SWIFT

Witnesses:
 I. T. WEAVER,
 R. W. E. MITCHELL.